US007082662B2

(12) United States Patent
Gauntt et al.

(10) Patent No.: US 7,082,662 B2
(45) Date of Patent: Aug. 1, 2006

(54) METHOD AND APPARATUS FOR INSTALLING SECTIONAL FLOORING

(76) Inventors: Bruce V. C. Gauntt, 18330 Edwards Oaks, San Antonio, TX (US) 78259; Cristino Alvarez, 3014 Cenizo Rd., San Antonio, TX (US) 78264

( * ) Notice: Subject to any disclaimer, the term of this patent is extended or adjusted under 35 U.S.C. 154(b) by 231 days.

(21) Appl. No.: 10/767,580

(22) Filed: Jan. 29, 2004

(65) Prior Publication Data

US 2005/0166379 A1 Aug. 4, 2005

(51) Int. Cl.
*B23P 6/00* (2006.01)
*B23P 19/00* (2006.01)

(52) U.S. Cl. .............................. 29/402.08; 29/402.09; 29/402.11; 29/426.5; 29/700; 29/252; 29/267; 254/89 H; 254/93 R; 254/89 R

(58) Field of Classification Search ............ 29/402.03, 29/402.08, 402.09, 402.11, 426.1, 426.5, 29/244, 252, 267, 278, 281.6, 700; 254/9 B, 254/2 B, 93 R, 89 H, 93 H, 89 R
See application file for complete search history.

(56) References Cited

U.S. PATENT DOCUMENTS 2,779,949 A * 2/1957 Crispin ...................... 4/563.1
2,973,184 A * 2/1961 Trautman et al. .......... 254/2 B
3,028,145 A * 4/1962 Brand ....................... 254/134
3,117,764 A * 1/1964 Schultz et al. ............. 254/2 B
3,939,546 A * 2/1976 Hernandez ................... 29/278
4,241,901 A * 12/1980 Shircliffe .................. 254/89 H
4,921,385 A * 5/1990 Okuno ........................ 414/21
5,322,265 A * 6/1994 Keuck ...................... 254/89 H
6,378,843 B1 * 4/2002 Hong ........................ 254/2 R
6,390,450 B1 * 5/2002 Bressner et al. ........... 254/4 B
6,581,913 B1 * 6/2003 Conomos et al. ....... 254/133 R
6,601,825 B1 * 8/2003 Bressner et al. ........... 254/4 R
6,641,115 B1 * 11/2003 Bainter ..................... 254/89 H
2005/0081355 A1 * 4/2005 Nechvatal ................. 29/426.5

* cited by examiner

*Primary Examiner*—Essama Omgba
(74) *Attorney, Agent, or Firm*—Christopher L. Makay

(57) ABSTRACT

A sectional flooring installation device allows carpet installation teams to quickly remove and install sectional carpeting in locations that have multitudes of the bookshelf assemblies, for example, libraries. The sectional flooring installation device includes a bridge assembly, a lifting device, a bearing plate, and a transfer unit to raise supports for bookshelf assemblies. The bridge assembly spans the tile, the transfer unit engages a vertical support, and the lifting device displaces the transfer unit relative to the bridge assembly to free pinned tiles or broad loom carpet sections. Once a pinned tile or carpet section is removed, a replacement tile may be installed. Use of the sectional flooring installation device essentially eliminates the requirement of removing bookshelf assemblies, reinstalling the bookshelf assemblies, and realigning the bookshelf assemblies after installation of the carpet. Accordingly, installation cost will decrease when using the sectional flooring installation device.

10 Claims, 10 Drawing Sheets

METHOD AND APPARATUS FOR INSTALLING SECTIONAL FLOORING

BACKGROUND OF THE INVENTION

1. Field of the Invention

The present invention relates to installing carpet and, more particularly, but not by way of limitation, to methods and an apparatus for installing sectional flooring in a library setting.

2. Description of the Related Art

In the flooring and floor covering industry, a specific cost per unit of floor covering is further burdened with installation costs, as floor covering is typically installed by professionals. In the private sector, few consumers have the knowledge, expertise or tools required to install floor covering. In the public sector, floor covering contracts are usually awarded to a lowest bid. Thus, the installation of flooring in public facilities is a competitive bid process.

Bidders for the installation contract must account for the cost of materials and installation of the floor covering in a variety of location specific conditions, ranging from uninhabited new construction to inhabited existing structures. Placing flooring in an uninhabited building is clearly simpler than removing and repositioning furnishings, including aquariums, planters, bookshelves, and the like.

In many commercial applications, sectional carpet tiles are used to ease the maintenance burden, as stained or damaged tiles may be replaced as needed. While the use of sectional flooring does ease the removal and replacement of accessible tiles, the process is still problematic when a tile is pinned underneath an obstacle such as a bookshelf. A high quantity of pinned tiles further complicates the replacement operation. In buildings with intended purposes, such as libraries, bidders must also take into account any protocols for removing and installing existing furnishings. For example, bays of bookshelves in libraries must be installed and sighted in with a laser. This requirement clearly impacts the installation costs for floor covering in a library setting.

Accordingly, an apparatus that allows sectional flooring to be installed in libraries without disrupting the location and alignment of the bookshelf assemblies would be beneficial to installers of floor covering.

SUMMARY OF THE INVENTION

In accordance with the present invention, a sectional flooring installation device allows carpet installation teams to quickly remove and install sectional carpeting in locations that have multitudes of bookshelf assemblies, for example, libraries. The sectional flooring installation device includes a bridge assembly, a lifting device, and a transfer unit to raise supports for bookshelf assemblies. The bridge assembly spans the tile, the transfer unit engages a vertical support, and the lifting device displaces the transfer unit relative to the bridge assembly to free pinned tiles. Once a pinned tile is removed, a replacement tile may be installed.

A method of use is further provided. Use of the sectional flooring installation device essentially eliminates the requirement of removing bookshelf assemblies, reinstalling the bookshelf assemblies, and realigning the bookshelf assemblies after installation of the carpet. Accordingly, installation costs will decrease when using the sectional flooring installation device.

It is therefore an object of the present invention to provide a sectional flooring installation device that allows floor covering to be installed in library situations without removing the bookshelf assemblies.

It is a further object of the present invention to provide a variable height bridge assembly to overcome virtually any location specific parameters.

It is still further an object of the present invention to provide a method for replacing pinned tiles in flooring installation settings.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

BRIEF DESCRIPTION OF THE DRAWINGS

FIG. 3*a* illustrates a bookshelf assembly for a typical library setting, including existing flooring underneath.

DETAILED DESCRIPTION OF THE PREFERRED EMBODIMENT

Figure 1:
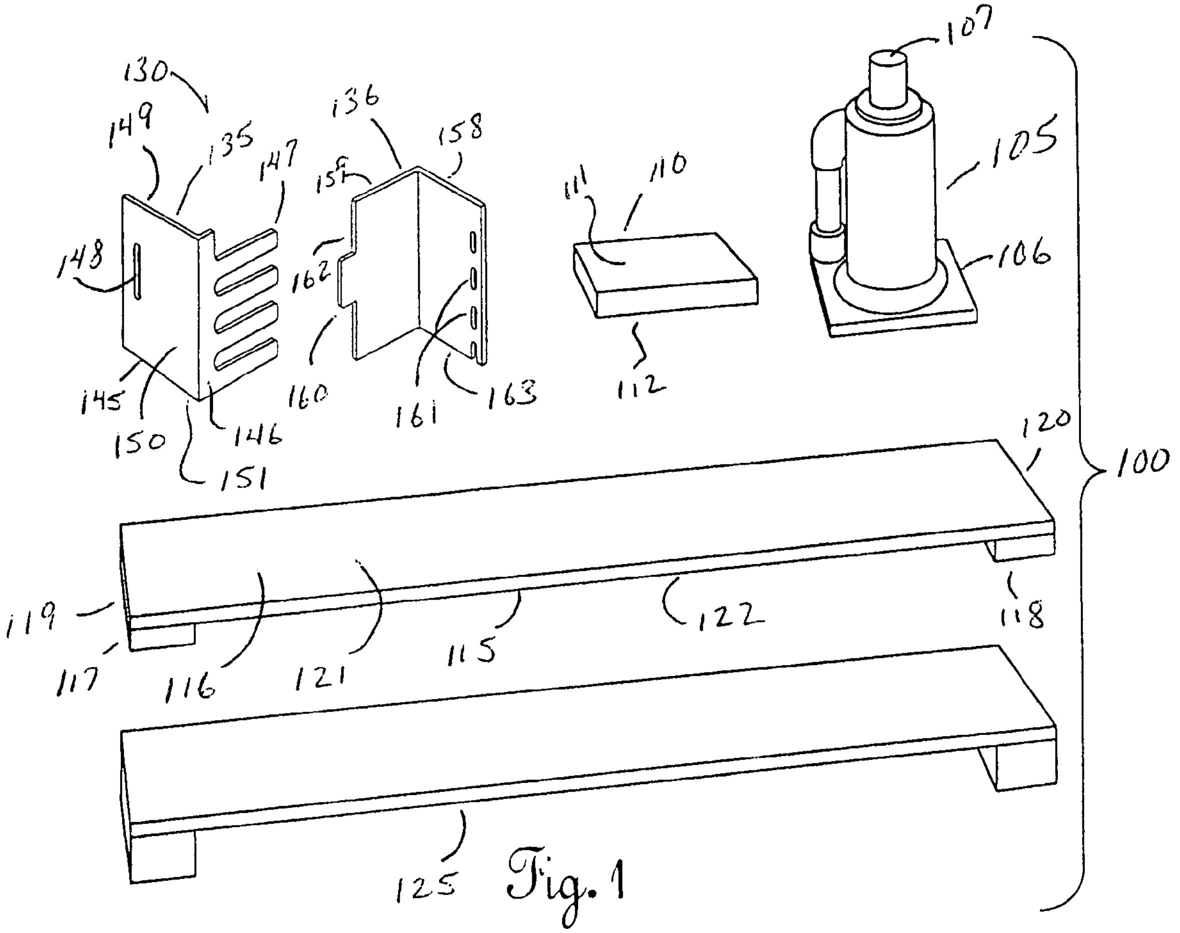
FIG. 1 provides a perspective view of the components for a sectional flooring installation device according to the preferred embodiment.
Figure 2:
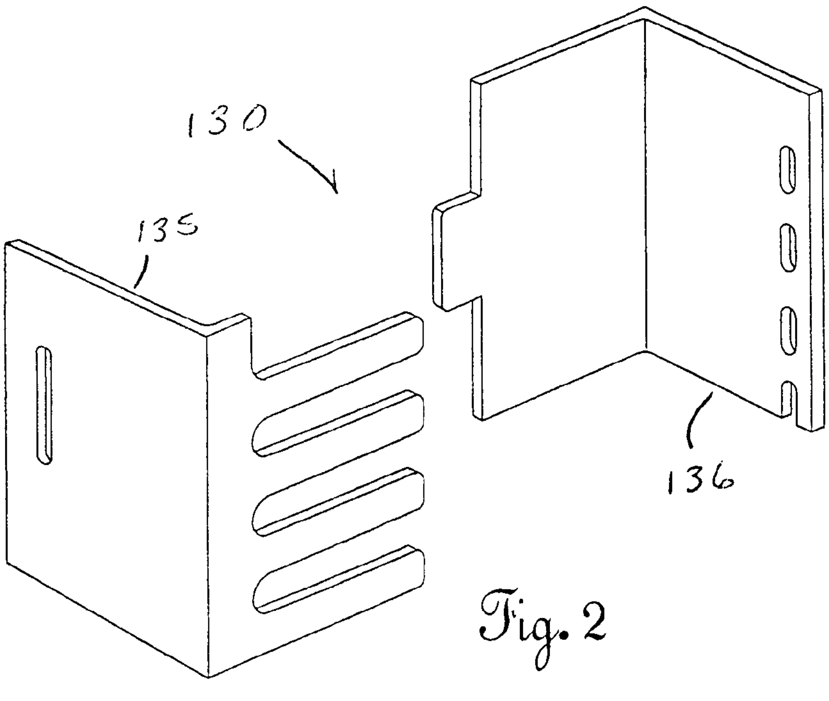
FIG. 2 provides a perspective view of a transfer unit according to the preferred embodiment.

As required, detailed embodiments of the present invention are disclosed herein; however, it is to be understood that the disclosed embodiments are merely exemplary of the invention, which may be embodied in various forms. It is further to be understood that the figures are not necessarily to scale, and some features may be exaggerated to show details of particular components or steps.

A carpet installation apparatus is used to free carpeting sections located underneath objects, namely bookshelves in libraries. Some commercial carpeting is sectional, and may also be known as "carpet tile" or "modular carpet." The carpet tiles are installed together to provide a wall-to-wall carpeting effect. The installation apparatus allows carpeting to be removed and replaced in furnished libraries with minimal impact to existing shelving and shelving alignments, thereby reducing installation times and associated costs. A method for using the carpet installation apparatus is also provided.

As shown in FIGS. 1–4, a sectional flooring installation device 100 includes a lifting device 105, a bearing plate 110, and a transfer unit 130. The installation device 100 further includes a bridge assembly 115. The lifting device 105 may be of the hydraulic type, commonly sold in industrial markets, having a base 106, a handle 108, and a hydraulic cylinder with a piston 107. The lifting device 105 further includes an open and close valve (not shown) to engage and disengage the displacement function. The size and capacity of the lifting device 105 may vary depending upon individual site demands.

The bearing plate 110 is used to distribute the lifting force from the lifting device 105 to the transfer unit 130 during use. The bearing plate 110 includes a first side 111 and a second side 112. The bearing plate 110 is typically made of a steel, however, any suitable material with load bearing capacity and stiffness sufficient to withstand the loads applied in use may be employed. The bearing plate 110 should be of any size suitable to substantially fully engage the transfer unit 130 and fit within the confines of the working environment. It should be understood that the transfer unit 130 may be made integral with either the lifting device 105 or the transfer unit 130.

The transfer unit 130 includes a fork 135 and a fork bearing unit 136. The fork 135 includes a first leg 145 and a second leg 146 at a substantially right angle. The first leg 145 includes a slot 148. The second leg 146 includes a plurality of tines 147, four in this preferred embodiment. The tines 147 are sized and spaced to protrude through a hole pattern in a vertical support of a bookshelf assembly. The fork bearing unit 136 includes a first leg 158 and a second leg 159 also at a substantially right angle. The first leg 158 includes a plurality of slots 161 of size and shape complementary to the tines 147 of the fork 135. The second leg 159 includes a protrusion 160 centered along an outer edge of the second leg 159. The protrusion 160 is of a size complementary to the slot 148 in the first leg 145 of the fork 135. The fork 135 and the fork bearing unit 136 are designed to engage each other, thereby forming a substantially hollow section. Engagement of the fork 135 and the fork bearing unit 136 is accomplished by aligning the tines 147 of the fork 135 with the slots 161 of the fork bearing unit 136 and aligning the protrusion 160 of the fork bearing unit 136 with the slot 148 in the fork 135. When the components are properly aligned, the tines 147 and the protrusion 160 may pass through their respective slots. The fork 135 and the fork bearing unit 136 will move closer until the first face 149 of the first leg 145 is seated on a leading edge 162 of the second leg 159 of the fork bearing unit 136. In this arrangement, the loads applied to a lower end 151 of the fork 135 and a lower end 163 of the fork bearing unit 136 may be transferred to the tines 147 and objects that the tines 147 engage.

The bridge assembly 115 includes a top plate 116, a first support 117, and a second support 118. The top plate 116 is of a rectangular shape having a top face 121, a bottom face 122, a first end 119 and a second end 120. The first support 117 is coupled to the bottom face 122 at the first end 119 of the top plate 116. The second support 118 is coupled to the bottom face 122 at the second end 120 of the top plate 116, such that the top plate 116 may rest on the supports 117 and 118, thereby spanning the area between the supports 117 and 118. The span may be any suitable distance as constrained by carpet section sizes and inertial properties of the top plate 116. The height of the supports 117 and 118 may be dictated by access requirements underneath the bridge assembly 115. The top plate 116 may be fabricated from any suitable material having acceptable load carrying capacity and stiffness, such as steel or aluminum. The supports 117 and 118 may be manufactured from any suitable material having acceptable compressive loading properties, for example, steel, aluminum, wood, etc.

In a library setting, a floor is usually covered with a floor covering 200, as shown in FIG. 3A. A bookshelf assembly 210 typically includes a vertical support 215, a cross-support 220, and shelves 225. The cross-supports 220 are mounted to the vertical supports 215 to provide support perpendicular to the bookshelf assembly 210. The vertical supports 215 include apertures 216 at a consistent spacing that protrude through the whole support 215 and provide attachment means for shelves. In many cases, the vertical support 215 rests on a flange of the cross-support 220 to distribute loading, as well as to protect the floor covering 200. In a bookshelf assembly 210, multiple vertical supports 215 and cross-supports 220 may be used to support the runs of bookshelves 225. In most cases, the shelving in the library has been installed according to stringent spacing requirements. As such, removal and reinstallation of furnishings in a floor covering 200 replacement is complicated.

The floor covering 200 is usually of a sectional construction, comprised of a multitude of individual tiles 205. Individual tiles 205 may be easily removed and replaced if there are no obstructions. In situations where the floor covering 200 is of a broad loom construction and is being removed, the carpet 200 must be cut around any points of obstruction. Accordingly, pinned tiles 205 and remaining broad loom carpet sections that are pinned due to objects such as the bookshelf assemblies 210 have previously not been easily replaceable. Therefore, complete removal and replacement of the floor covering 200 can prove extremely costly. It should be clear to one skilled in the art that areas that include broad loom carpet are cut back to the point of obstruction during the removal of the carpeting, thereby creating individual sections of broad loom carpet pinned beneath objects. It should still further be clear to one skilled in the art that the individual sections of the broad loom carpet that are pinned may be treated as individual flooring tiles during the removal and reinstallation process, as described in this disclosure.

Figure 3B:
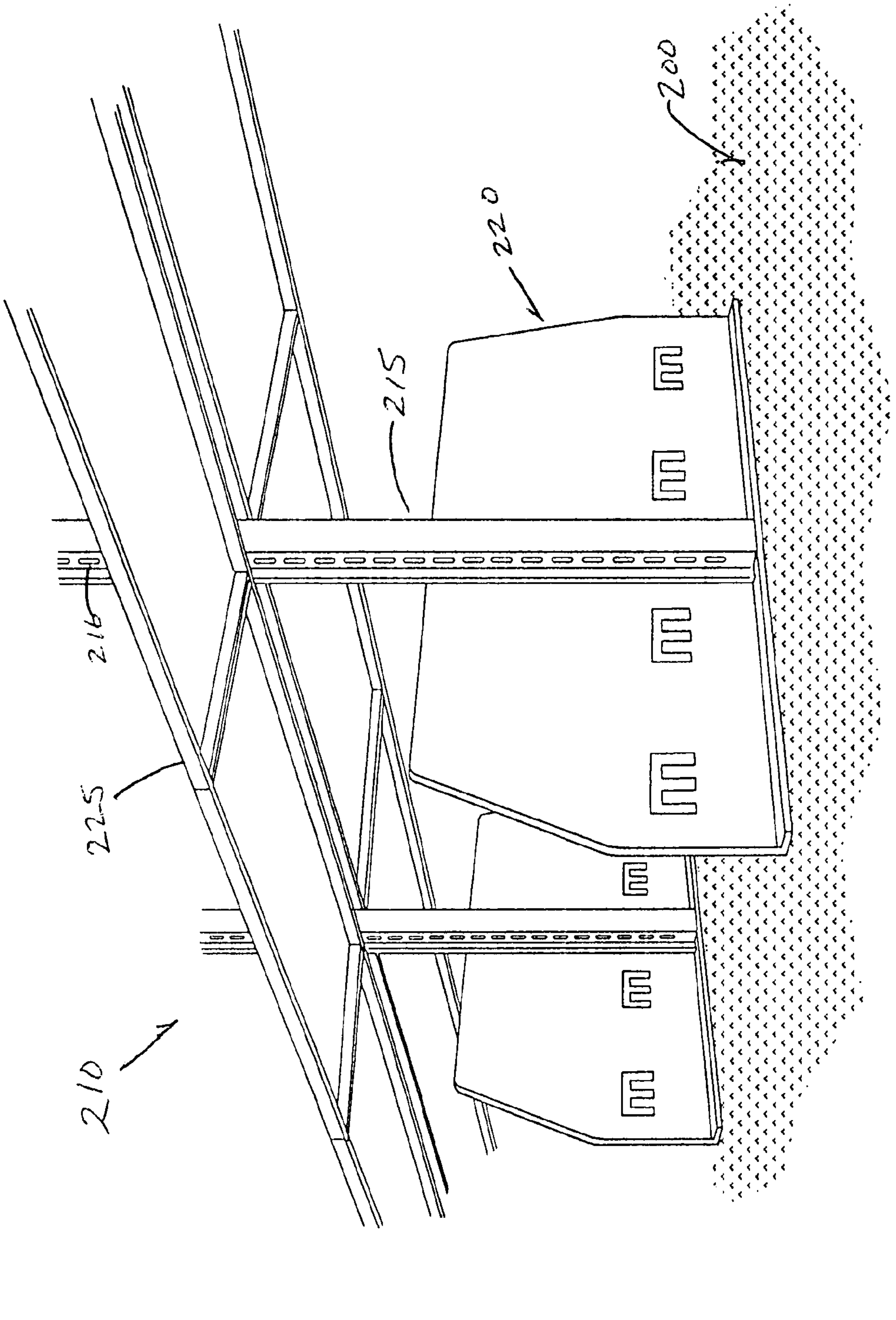
FIG. 3*b* illustrates the bookshelf assembly with existing flooring removed, except from underneath a cross-support of the bookshelf assembly.
Figure 3B:
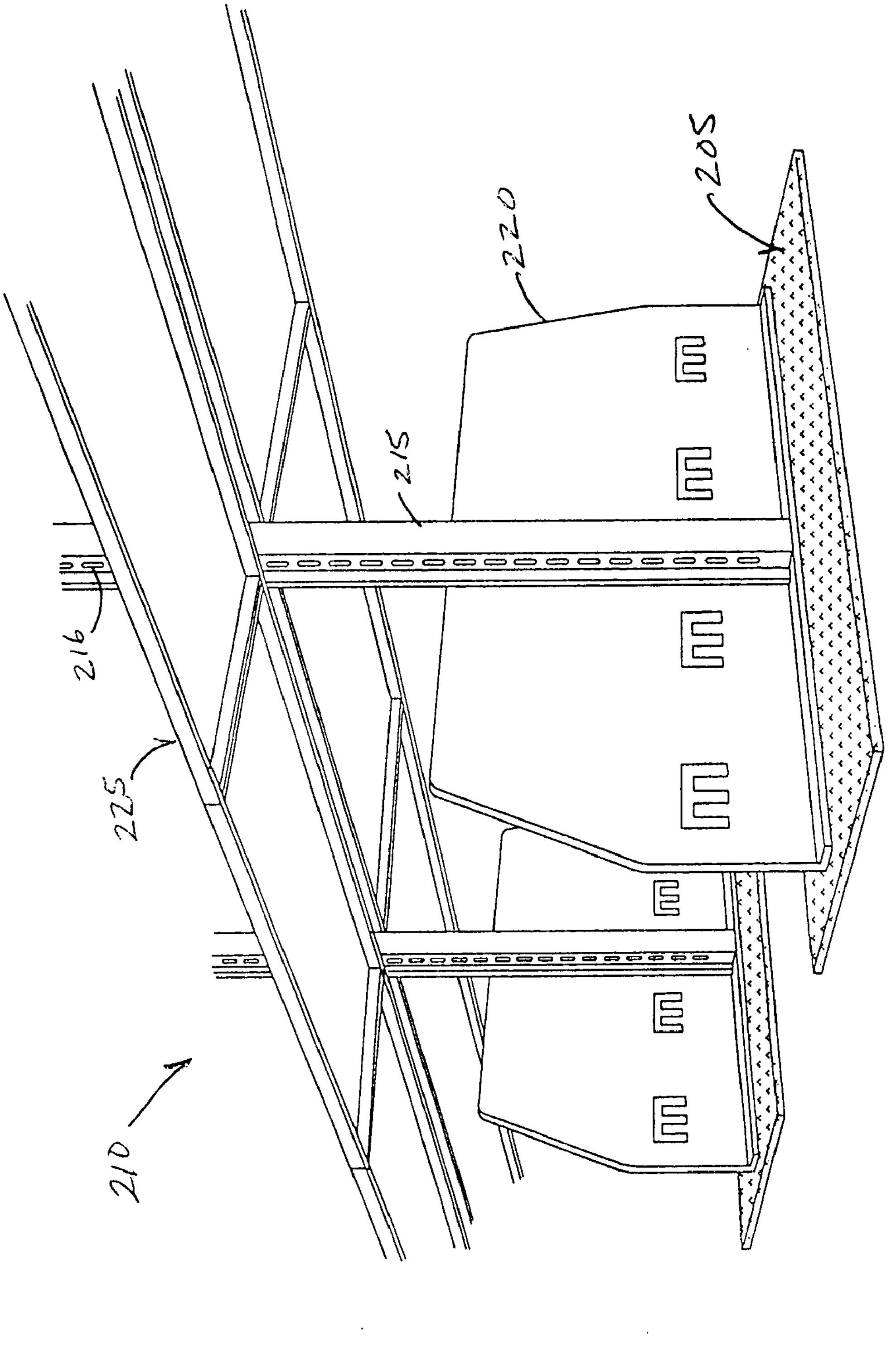
Figure 3C:
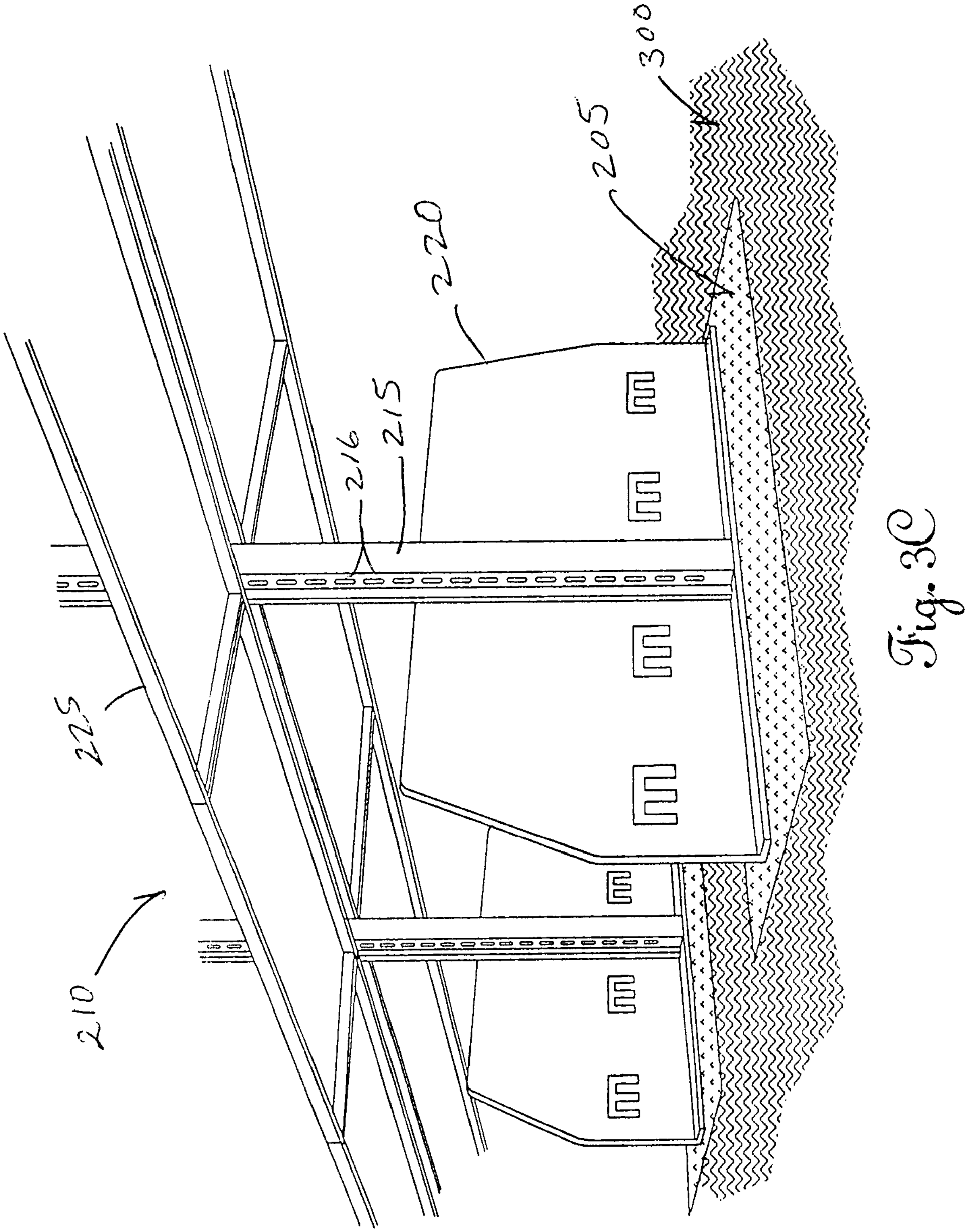
FIG. 3*c* illustrates the bookshelf assembly with new flooring installed, except for underneath the cross-support of the bookshelf assembly.
Figure 3D:
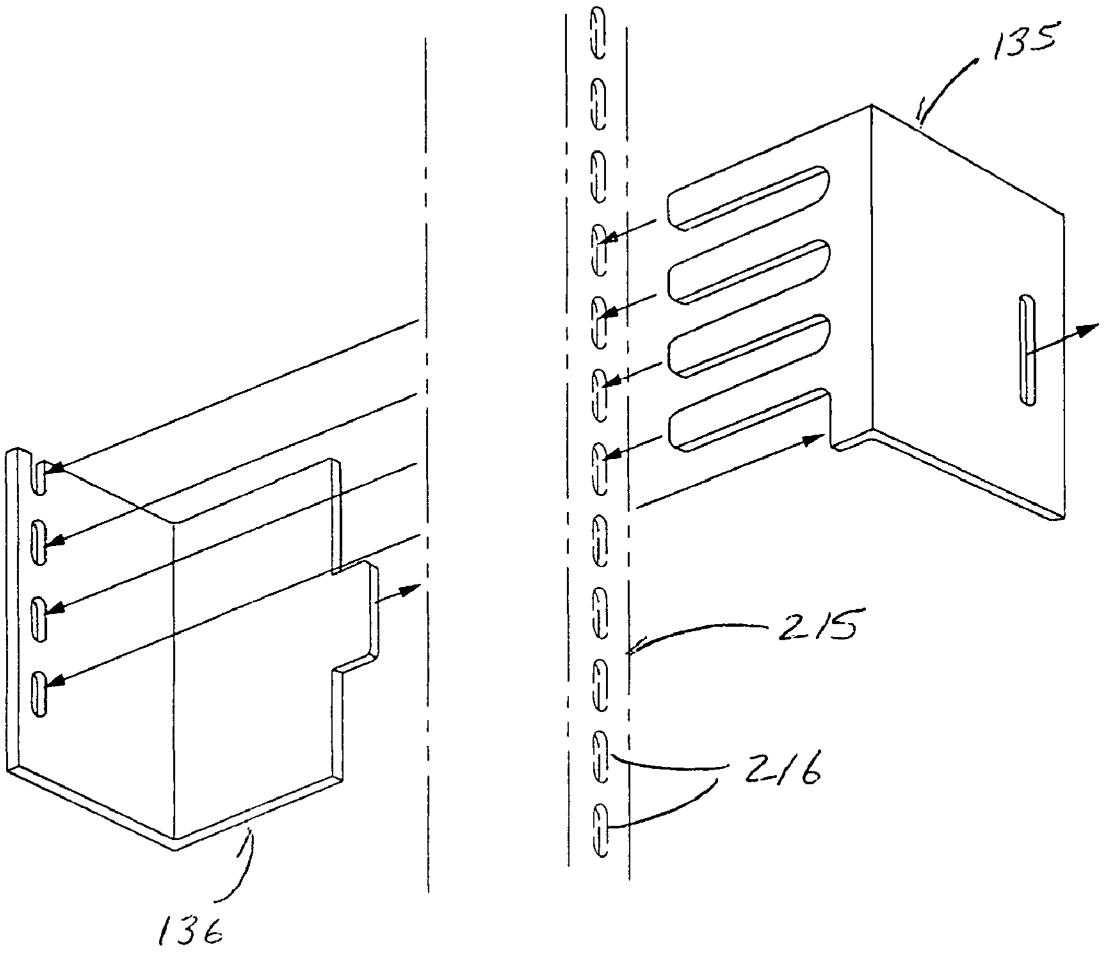
FIG. 3*d* provides a perspective view of the transfer unit and a vertical support of the bookshelf assembly according to the preferred embodiment.

In a typical flooring replacement scenario, the process commences with a local environment as depicted in FIG. 3*a*. In most instances, a flooring installer would remove all of the flooring tiles 205 or broad loom carpet that is not pinned beneath items, such as cross-supports 220 and vertical supports 215 for bookshelf assemblies 210. As shown in FIG. 3*b*, only the pinned tiles 205 or broad loom carpet sections that are pinned underneath items remain on the floor. Next, the flooring installer places the new floor covering 300 onto the floor around the pinned tiles 205 or the sections of broad loom carpet, as shown in FIG. 3*c*. At this point, the flooring installer employs the use of the sectional flooring installation device 100 to free the pinned tiles 205 or broad loom carpet sections.

Figure 5:
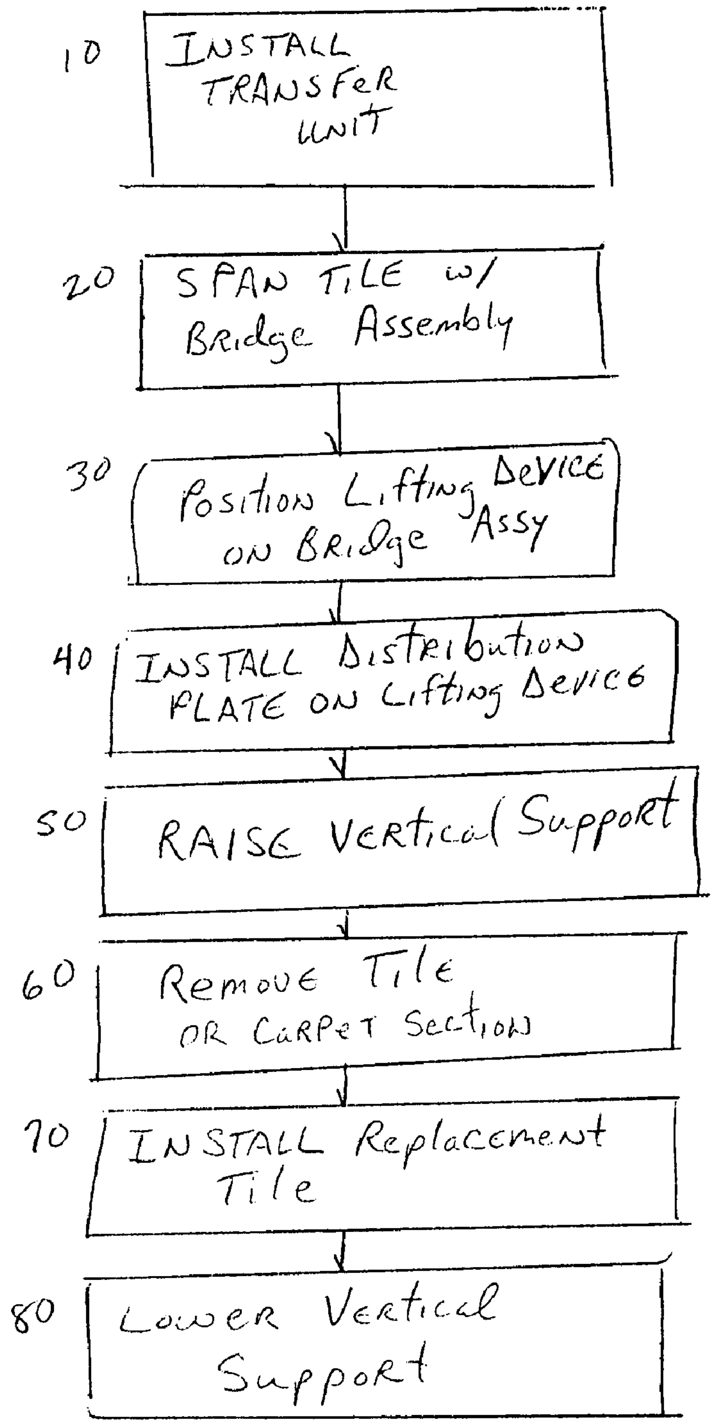
FIG. 5 provides a method flowchart illustrating the process of replacing a pinned tile according to the preferred embodiment.

The process of replacing the tile 205 or the broad loom carpet section is shown in the method flowchart of FIG. 5. The process begins with step 10, wherein the tines 147 of the fork 135 are inserted into the apertures 216 of the vertical support 215 at a predetermined distance above the pinned tile 205 or broad loom carpet section, and beneath a lowest shelf 220, such that the lower end 151 of the fork 135 is nearest the tile 205. The tines 147 of the fork 135 are fully inserted through the vertical support 215 and protrude through the opposing side. Once inserted, the fork bearing unit 136 is mated to the fork 135 as previously disclosed. Accordingly, the lower end 151 of the fork 135 and the lower end 163 of the fork bearing unit 136 are nearest the tile 205 or broad loom carpet section.

Figure 3E:
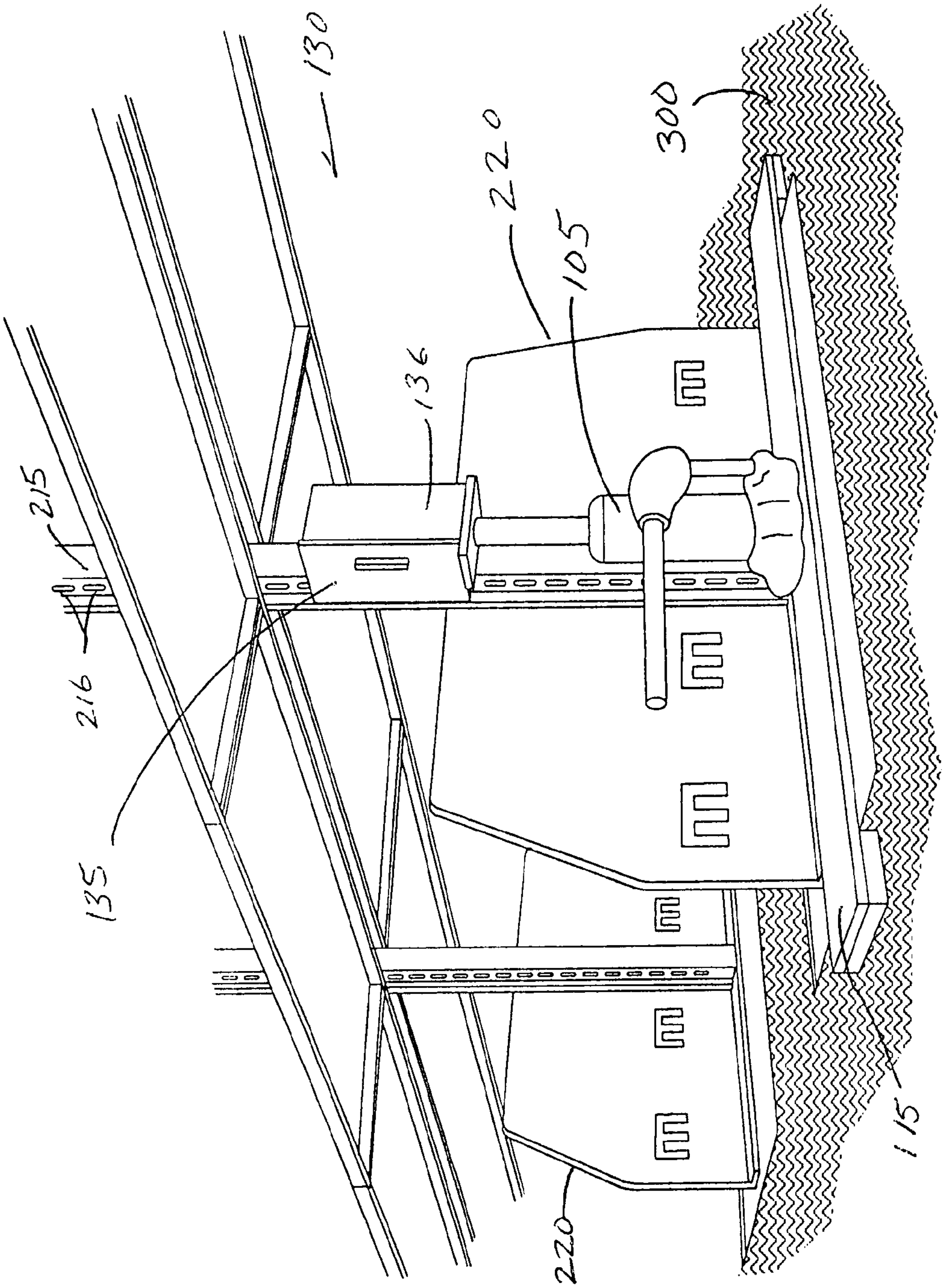
FIG. 3*e* illustrates the sectional flooring installation device in use as it spans a tile pinned beneath the cross-support of the bookshelf assembly.

As shown in FIG. 3*e*, the sectional flooring installation device 100 spans the pinned tile 205 or broad loom carpet section. The process continues with step 20, wherein the operator places the bridge assembly 115 adjacent to the vertical support 215 and underneath the transfer unit 130. The bridge assembly 115 is placed with the top face 121 nearest the lower ends 151 and 163 of the fork 135 and the fork bearing unit 136, respectively. The bridge assembly 115 is further positioned such that the supports 117 and 118 do not rest on the tile 205 to be removed, thereby spanning the tile 205 or broad loom carpet section to be removed. Next, step 30, the lifting device 105 is placed on the top of the bridge assembly 115, such that the base 106 rests squarely on the top face 121 of the top plate 116. The lifting device 105 is further aligned underneath the transfer unit 130, such that the piston 107 is substantially centered under the transfer unit 130.

Figure 3F:
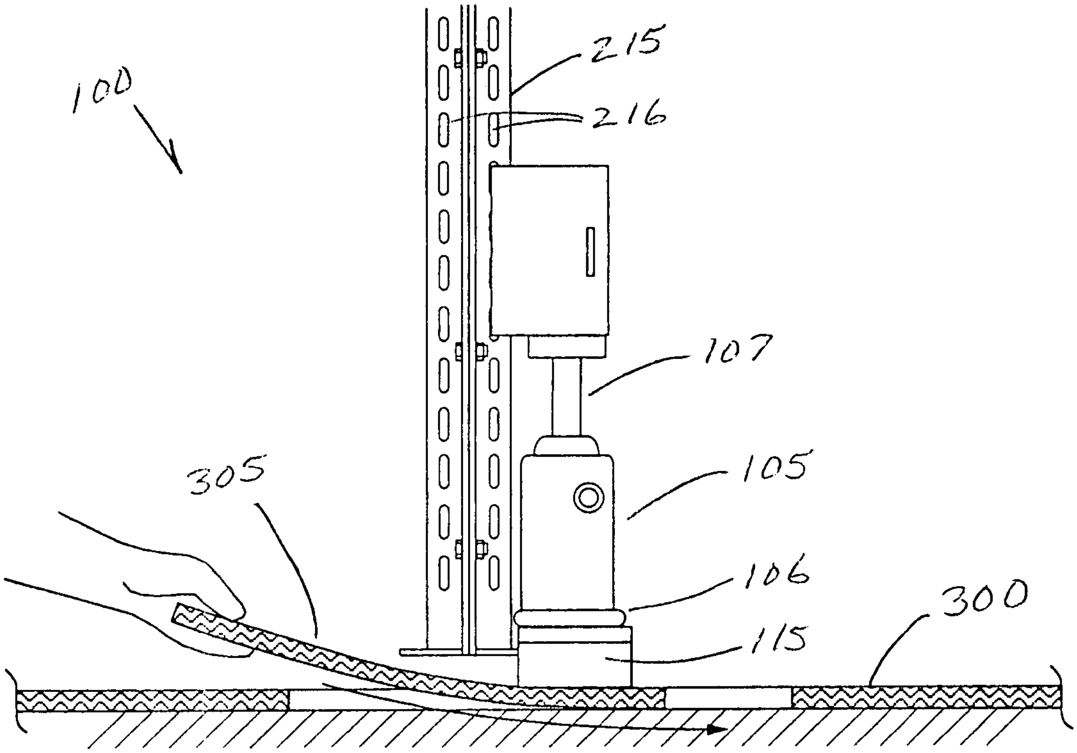
FIG. 3*f* provides a side view illustrating the installation of a tile according to the preferred embodiment.
Figure 3G:
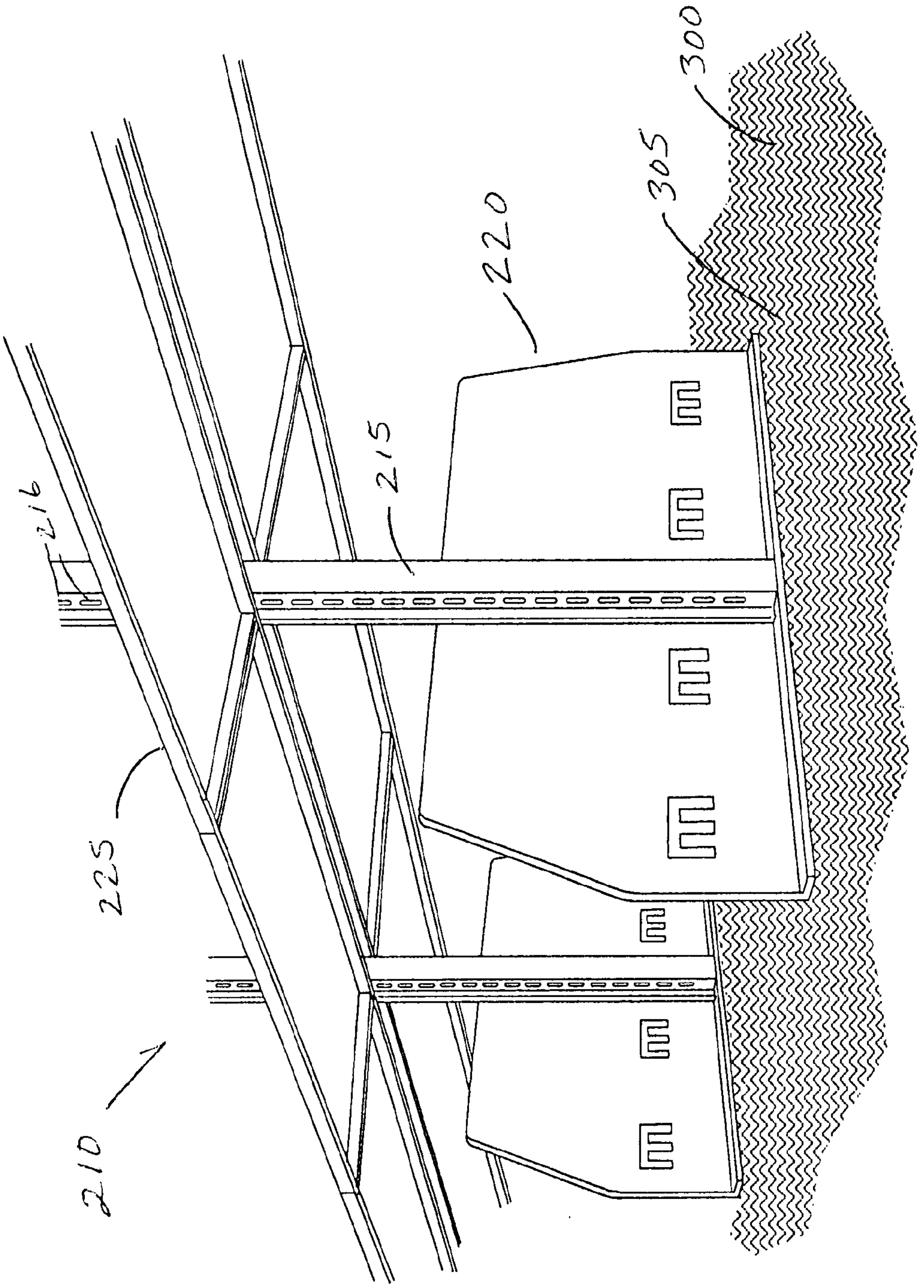
FIG. 3*g* illustrates the library setting with new carpet fully installed according to the preferred embodiment.

In step 40, the operator places the distribution plate 110 on top of the piston 107. The distribution plate 110 is substantially centered on the piston 107 and underneath the transfer unit 130. The operator then raises and lowers the handle 108 of the lifting device 105 to raise the piston 107, until an upper side of the distribution plate 110 engages the lower end of the transfer unit 130. Once engaged, any further upward movement of the piston 107 is transferred to the transfer unit 130 and the vertical support 215. The operator continues to provide vertical displacement of the piston 107, thereby raising the vertical support 215, step 50. The increased displacement of the piston 107 lifts the vertical support 215 from the floor and frees the pinned tile 205 or broad loom carpet section. In step 60, the operator removes the previously pinned tile 205 or carpet section. Step 70 provides for the installation of a replacement tile 305 in the uncovered area, as shown in FIG. 3*f*. Step 80 provides for lowering the vertical support 215 to transfer the loading of vertical support 215 to the floor. Each vertical support 215 may be lifted individually, thereby minimizing any induced misalignment between the vertical supports 215 and the bookshelf assemblies 210. Once all of the pinned tiles 205 or broad loom carpet sections have been replaced, the floor is substantially covered by the new floor covering 300, as shown in FIG. 3*g*.

Figure 4:
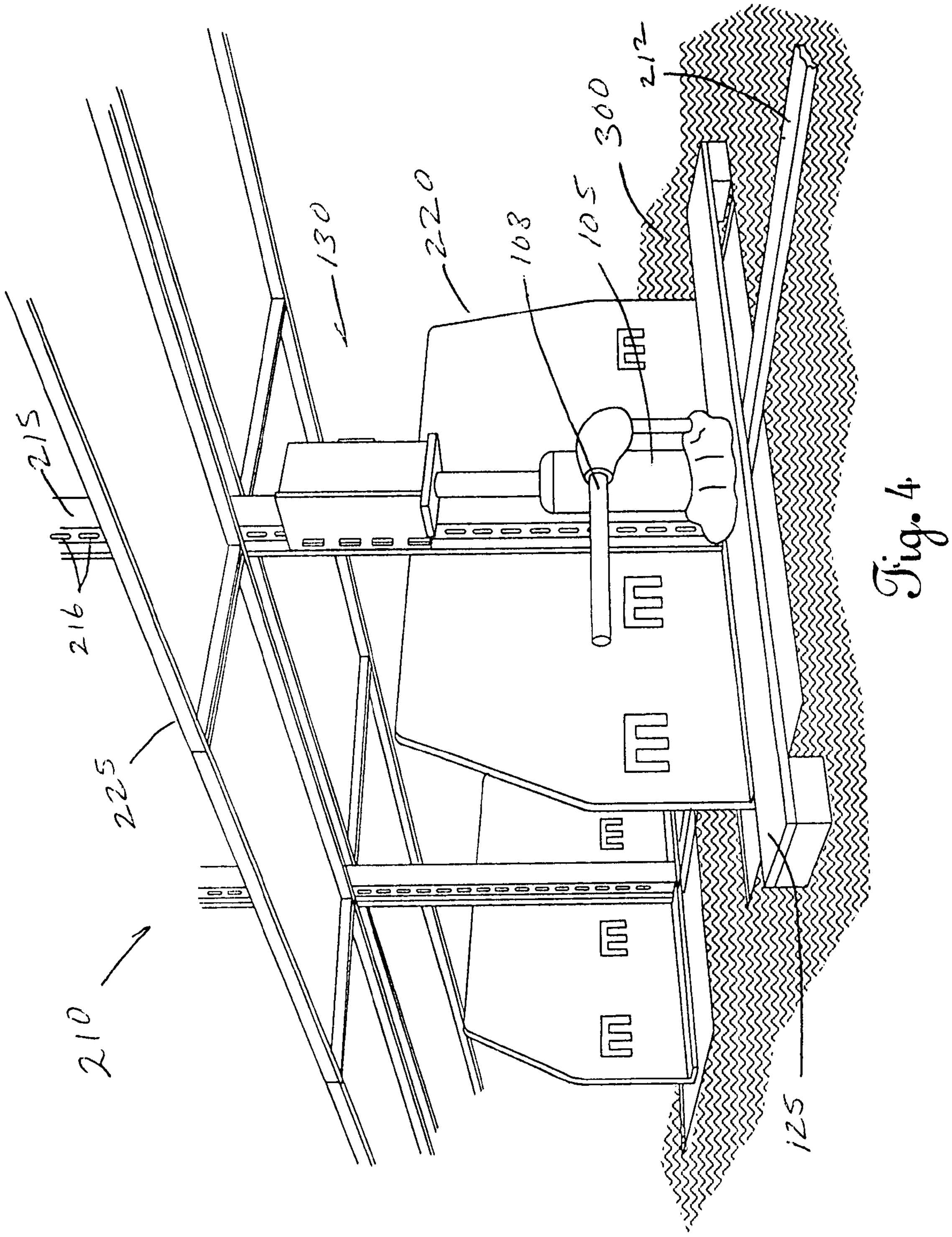
FIG. 4 illustrates a second embodiment designed to address bookshelf assemblies having an additional restraint.

In a second embodiment, a bridge 125 includes supports 126 and 127 that are of an increased height sufficient to provide adequate clearance in situations where the bookshelf assembly 210 further includes an additional restraint 212 on the carpet 205, as shown in FIG. 4. All operations for the removal and replacement of a tile 205 or broad loom carpet section are identical to those previously disclosed. The additional height provides clearance between a topside of the restraint 212 and the bottom face 122 of the top plate 116, as well as a displacement clearance for the lifting operation. It should be clear to one skilled in the art that the height of the supports 126 and 127 may be virtually any height that will work within the location specific parameters, including shelf height, floor cover 300 thickness, and tile 205 size. Further, the support heights could be of an adjustable type to accommodate virtually any location specific restriction. It should further be clear to one skilled in the art that minimal vertical displacement is desired to minimize the possibility of misalignment and stress on the shelving or other furnishings.

In summary, the sectional flooring installation device 100 allows carpet installation teams to quickly remove and install sectional carpeting in locations that have multitudes of the bookshelf assemblies 210, for example, libraries. Use of the sectional flooring installation device 100 essentially eliminates the requirement of removing bookshelf assemblies 210, reinstalling the bookshelf assemblies 210, and realigning the bookshelf assemblies 210 after installation of the carpet 300. Accordingly, installation cost will decrease when using the sectional flooring installation device 100.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

We claim:

1. A sectional flooring installation device, comprising:

a transfer unit, the transfer unit engaging a vertical support of a bookshelf assembly;

a bridge assembly, wherein the bridge assembly spans and is elevated over a tile pinned underneath the vertical support such that the bridge assembly does not contact the pinned tile; and a lifting device, wherein the lifting device is placed on the bridge assembly and underneath the transfer unit, and further wherein the lifting device is expanded by an operator to engage the transfer unit and raise the vertical support, thereby freeing the pinned tile for removal from underneath both the vertical support and the bridge assembly.

2. The sectional flooring installation device according to claim 1, further comprising a distribution plate to evenly distribute the lifting force of the lifting device to the transfer unit.

3. The sectional flooring installation device according to claim 1, wherein the transfer unit engages a hole pattern in the vertical support.

4. The sectional flooring installation device according to claim 1, wherein the transfer unit includes a fork to engage a hole pattern in the vertical support.

5. The sectional flooring installation device according to claim 1, wherein the lifting device is a hydraulic jack.

6. The sectional flooring installation device according to claim 1, wherein the tile is unpinned for replacement.

7. The sectional flooring installation device according to claim 1, further comprising a variable height bridge assembly to compensate for bookshelf restraints near the floor covering.

8. The sectional flooring installation device according to claim 1, wherein the pinned tile is a section of broad loom carpet.

9. A method of replacing pinned flooring tiles, comprising:

a. attaching a transfer unit to a vertical support of a bookshelf assembly;

b. spanning a tile pinned beneath the vertical support with a bridge assembly that is elevated over the pinned tile such that the bridge assembly does not contact the pinned tile;

c. placing a lifting device on top of the bridge assembly;

d. expanding the lifting device on the bridge assembly to engage the transfer unit;

e. lifting the vertical support to free the pinned tile;

f. removing the pinned tile from underneath both the vertical support and the bridge assembly;

g. inserting a new tile in place beneath the raised vertical support and the bridge assembly; and h. lowering the raised vertical support.

10. The method according to claim 9, wherein the tile is a section of broad loom carpet.

* * * * *